Patented Oct. 8, 1940

2,216,849

UNITED STATES PATENT OFFICE 2,216,849

PROCESS FOR PREPARING ARYL MERCAPTANS

Herbert August Lubs, Wilmington, Del., and Alfred J. Johnson, Woodstown, N. J., assignors to E. I. du Pont de Nemours & Company, Wilmington, Del., a corporation of Delaware No Drawing. Application May 28, 1938, Serial No. 210,784

3 Claims. (Cl. 260—609)

This invention relates to the production of aryl mercaptans from aryl sulfon halides, and more particularly to the production of thio-naphthols.

The invention had for an object the design of an economic process for the manufacture of aromatic mercaptans. A further object was the development of a commercial process for the conversion of naphthalene sulfon chloride to the corresponding thio-naphthol. A general advance in the art and other objects which will appear hereinafter are also contemplated.

It has now been found that zinc dust can be added to an aqueous suspension of naphthalene sulfon chloride without the formation of a sulfinic acid, and that the addition of a mineral acid to such a suspension containing the proper amount of water may be made safely and economically. With such a procedure the reaction can be kept under control and the temperature held low enough to prevent the formation of by-products.

This discovery is employed in carrying out the present invention according to which naphthalene sulfon chloride is mixed in aqueous suspension with zinc dust and a mineral acid below 60° C., the temperature adjusted to 80°–100° C., and stirred at this temperature until the reduction to the mercaptan is complete.

From the following description and specific examples, in which are disclosed certain embodiments of the invention as well as details of what is believed to be the best mode for carrying out the invention, it will be apparent how the foregoing objects and related ends are accomplished. The quantities are given in parts by weight throughout the application.

Example I

The preparation of beta-thio-naphthol was carried out by adding naphthalene-beta-sulfon chloride (68 parts) and water (280 parts) in a suitable vessel and while stirring the mixture at ordinary normal room temperature, adding zinc dust (100 parts) and 22.5% hydrochloric acid (522 parts). When the addition was complete the charge was heated cautiously to 60°–65° C. to start the reaction. When the temperature started to rise from the heat of the reaction, the supply of external heat was stopped and the temperature allowed to rise to 80°–100° C. (sometimes it is necessary to add water or ice to prevent the temperature from going above 100° C.). The charge was held at 80°–100° C. (preferably in the range 95°–100° C.) for about 2 hours (the reaction is usually complete in this time) to complete the reduction. The charge was then cooled to 25° C. by the addition of ice (450 parts.) If the temperature goes below 25° C. no harm is done. The beta-thio-naphthol which separated as a crystalline mass was filtered off and washed.

The applicability of the process to the production of other thio-phenols (especially those of the benzene and polynuclear hydrocarbon series) will be apparent to those skilled in the art. Special mention may be made of the advantages of the process when applied to naphthalene-alpha-sulfon chloride and mixtures of alpha- and beta-naphthalene-sulfon chlorides in which cases results equally as good as those described in the example are obtained. The disulfon chlorides also behave similarly.

Because of the cost and related factors, hydrochloric acid and sulfuric acid are the preferred mineral acids, although other non-oxidizing mineral acids may be employed.

The success (operability) of the process is surprising since the prior work in this field indicated that the mixing of all the reactants might give rise to a vigorous reaction and a resultant poor yield of material.

In résumé, the invention has the following advantages:

(1) The avoidance of the formation of a difficultly soluble zinc sulfinate as an intermediate product, (2) A decreased cost resulting from preventing the excessive loss of hydrogen which occurs when a sulfon chloride is added to a mixture of hydrochloric acid and zinc (the process of Krafft and Schönherr, Ber. 22, 824) and (3) The simpler, easier and cheaper production of thio-naphthols because gradual additions of reactants and close supervision of the operation are unnecessary.

As many apparently widely different embodiments of this invention may be made without departing from the spirit and scope thereof, it is to be understood that we do not limit ourselves to the specific embodiments thereof except as defined in the appended claims.

We claim:

1. The process which comprises adding 68 parts of naphthalene-beta-sulfon chloride to 280 parts of water, and while stirring the resultant aqueous suspension of naphthalene-beta-sulfon chloride, adding at room temperature 100 parts of zinc dust and thereafter adding 522 parts of 22.5% hydrochloric acid, heating the charge cautiously until the reaction starts, maintaining the temperature of the reaction below 100° C. until the formation of beta-thio-naphthol is complete, cooling the reaction mass until the beta-thio-naphthol has crystallized, and thereafter isolating it.

2. The process of preparing thio-naphthols which comprises adding zinc to an aqueous suspension of a naphthalene-sulfon chloride at a temperature below that necessary to form the sulfinate, and thereafter adding a non-oxidizing mineral acid at the same temperature range, maintaining a temperature below 100° C. but above the temperature of reduction while reacting the components of the mixture, and isolating the thio-naphthol formed.

3. The process which comprises mixing a naphthalene sulfon chloride with water to form an aqueous suspension of a naphthalene sulfon chloride, and adding to this suspension in the order named, zinc and a mineral acid below 60° C., raising the temperature of the mixture to the range 65°–100° C. and maintaining the same until the formation of the corresponding thio-naphthol is complete, and thereafter isolating the thio-naphthol.

HERBERT AUGUST LUBS.
ALFRED J. JOHNSON.